3,322,696
FOAMED POLYLACTAMS
Charles F. Fisher, Wilmington, Del., and Mack F. Fuller, Wenonah, N.J., assignors to E. I. du Pont de Nemours and Company, Wilmington, Del., a corporation of Delaware
No Drawing. Filed May 6, 1964, Ser. No. 365,497
10 Claims. (Cl. 260—2.5)

The present invention relates to foamed polyamides having good durability, low density, and low monomer content and a method for their preparation.

The rapid anionic polymerization reaction of lactams to give molded polymer products at a temperature below the melting point of the polymer is well known and has reached great commercial importance. In order to reduce the cost and density of such molded products foaming or blowing agents have been added during the rapid polymerization to give low density foamed polyamides. The usual methods for obtaining low density lactam products is to add a chemical blowing agent which decomposes to give a gas during the polymerization reaction of the lactam. However, the methods described in the prior art have certain disadvantages. For example, chemical blowing agents used in processes of the prior art for producing polyamide foams are difficult to control in order to produce a fine, uniform foamed article having the desired bulk density and a smooth surfaced skin. Then, too, many chemical blowing agents known to the art decompose too soon and too rapidly under polymerization conditions. Other chemical blowing agents have the disadvantage of producing a relatively large monomer content, manifested as water extractable, in the polyamide foam when used in high concentration. Such monomer content in the foam is highly undesirable in plastic products, such as polycaprolactams, particularly those which are exposed to weathering, sterilizing and cleansing procedures, or articles that are to be painted.

An object of the present invention is to provide a novel chemical blowing agent suitable for use with the anionic polymerization of lactams, particularly caprolactam. Another object of this invention is to provide a process for making polyamide foams by the anionic cocatalyzed polymerization of lactams wherein the monomer content of the foamed product is low. Another object of this invention is to provide a process for making polyamide foams of low density. Another object of this invention is to provide a process for making foamed polyamides of low density that are substantially free of undesirable decomposition products. Another object of this invention is to provide a process for making foamed polyamides that is compatible with, and may be conducted in the presence of, various fillers, reinforcing agents, antioxidants, colorants and the like. Another object of the invention is to provide a process for making polyamides, particularly foamed polycaprolactam, that is economically advantageous over known prior art processes. These and certain other objects and advantages will appear in the following detailed description of the invention.

It has now been discovered that the anionic polymerization of lactams to form foamed polyamides can be effected with superior results by polymerizing a lactam in the presence of an anionic polymerization catalyst, a co-catalyst, and a certain blowing agent. Unexpected and superior results occur when the anionic cocatalyzed polymerization reaction is carried out in the presence of a blowing agent that comprises a hydrocarbon having from 2 to 7 carbon atoms and an allylic azide.

The hydrocarbons utilized as a component of the blowing agent are aliphatic saturated or unsaturated hydrocarbons having from 2 to 7 carbon atoms. Suitable hydrocarbons include, among others, ethylene, propylene, butene-2, butene-1, pentene-1, pentene-2, hexene-1, hexene-2, hexene-3, heptene-1, heptene-2, heptene-3, butadiene, acetylene, allene, 1,4-hexadiene, 1,3-hexadiene, propane, ethane, butane, pentane, hexane, heptane, 1,3,5-heptatriene.

The quantity of hydrocarbon used in the process of the present invention ranges from about 0.1 to 0.7 part per hundred parts (by weight) of lactam initially present in the reaction mixture. The preferred range is from about 0.2 to 0.6 part. When the hydrocarbon is a gas at ambient conditions the molten lactam is saturated with the hydrocarbon gas at the polymerization temperature.

The allylic azide utilized as a component of the blowing agent employed in the process of this invention are compounds corresponding to the generic formula.

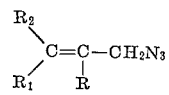

in which at least one azidomethyl group is directly attached to a carbon atom which in turn is attached to another carbon atom by a double bond which may occupy a position in either a linear or a cyclic structure. Accordingly, in the above formula, R, $R_1$ and $R_2$ may be hydrogen, alkyl groups, aryl groups and substituted alkyl and aryl groups; in the case of benzyl azides the

linkage will be included within the aromatic ring structure in which case R and $R_1$ taken together in the formula represent the carbon atoms completing the aromatic or benzenoid ring, which may also have additional substituents attached to the carbon atoms of the ring. These azides, as well as their method of preparation, are described more fully in a copending application Ser. No. 171,356, filed Feb. 6, 1962, now Patent No. 3,236,789. Preferred compounds that can be used are aliphatic azides having 8 to 24 carbon atoms and benzyl azides, especially alkyl substituted benzyl azides of 8 to 18 carbon atoms. Examples of the aforementioned azides are dodecenyl azide (i.e., 1-azido-5,5,7,7-tetramethyloctene-2); 2,3-, 2,4-, 2,5-, 3,4- and 2,6-dimethylbenzyl azide; 1,4-bis(azidomethyl)durene; p-phenoxybenzyl azide; monoazidomethyl-durene; dodecylbenzyl azide; 2,4,5-trimethylbenzyl azide; 3-azido-1-heptene; benzyl azide; methoxybenzyl azides; and mixtures thereof. 1-azido-5,5,77- tetramethyloctene-2; 1,4-bis(azidomethyl)durene; p-phenoxybenzyl azide; 3,4-dimethylbenzyl azide; and monoazidomethyl durene are particularly preferred because of their optimum foaming and processing properties in accordance with this invention.

The amount of allylic azides used in the process of this invention can be proportions varying from about 0.1 part per 100 parts of lactam to about 0.8 part per 100 parts of lactam depending on the density desired. The preferred range is between about 0.1 part/100 parts lactam to about 0.6 part/100 parts of lactam.

In the process of this invention the allylic azide component is generally added to the lactam with the hydrocarbon, or at approximately the same time as the hydrocarbon, and just before initiating polymerization. The allylic azide component should not be exposed to high temperatures in the presence of basic anionic catalysts for extended periods because they tend to lose gas. The allylic azide can be, for example, added to a portion of molten lactam containing the cocatalyst mixture just before combination of this portion with a portion of lactam containing the basic anionic catalyst, or the two portions can be mixed and then the allylic azide added quickly.

Generally, and preferably, allylic azides are added in solution in the hydrocarbons when the latter are liquids and when the hydrocarbon is a gas the azide and hydrocarbon mixture can be added under pressure or the molten lactam can be saturated with hydrocarbons at about the time the azide is added.

The polymerization process of this invention is particularly effective in producing rapidly high molecular weight foamed polyamides from ε-caprolactam alone or mixed with other lactams having from 3 to 12 or more carbon atoms in the lactam ring. Lactams which can be used alone or mixed with ε-caprolactam include, for example, enantholactam, caprylolactam, and laurolactam. Generally, the anionic polymerization process can be carried out at temperatures above the melting point of the lactam monomer but below the melting point of the resulting polyamide. In general, this temperature range is from about 25° C. to about 200° C., depending on the particular lactam employed. Caprolactam is readily polymerized by the process of this invention at temperatures between 100 and 200° C. with 150° C. being a convenient operating temperature. Lactams having more than five carbon atoms are preferred for the practice of this invention, and ε-caprolactam is especially preferred.

The anionic polymerization catalysts useful in the process of this invention are prepared by the reaction of strong bases with a lactam. Generally, the lactam to be polymerized is used for the preparation of the anionic catalyst; but if desired, the anionic catalyst can be prepared from one lactam and the preformed anionic catalyst used in the polymerization of another lactam.

The strong base employed to form the anionic polymerization catalyst may be an alkali metal, an alkaline earth metal, or a strongly basic derivative of one of these metals such as hydroxide, alkoxide, hydride, alkyl, aryl, or amide. All of these bases are of the type which are strong enough to convert the lactam to its iminium salt. Thus, sodium hydroxide, potassium hydroxide, lithium hydroxide, magnesium hydroxide, calcium hydroxide, strontium hydroxide, sodium methoxide, lithium hydride, sodium hydride, sodium methyl, sodium ethyl, sodium phenyl, sodium naphthyl, sodamide, and the like are suitable strong bases for the preparation of the anionic catalyst. The anionic polymerization catalyst is prepared by heating the lactam with a strong base at a temperature between about 25 and 225° C. The reaction can be represented as follows:

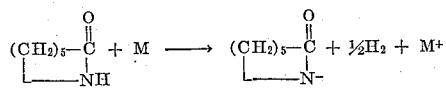

wherein M is a metal such as sodium.

The strong base used to form the anionic polymerization catalyst can be diluted with inert materials such as mineral oil or other hydrocarbon materials for ease of handling. For example sodium hydride is particularly susceptible to attack by moisture and the use of a mixture of NaH and oil instead of pure NaH is effective in making the addition of catalyst safer and easier. HB-40, a partially hydrogenated terphenyl, is a particularly suitable diluent. The base can be added to the total lactam which is to be polymerized or, to a portion of the lactam which is to be polymerized and this portion of the lactam containing the anionic catalyst added to more of the lactam later. Little or no polymerization occurs during the preparation of the anionic polymerization catalyst carried out between the melting point of the lactam and about 225° C. The time required for this step in the process depends upon the strength of the base employed, the proportion added, and the temperature chosen and may take from a few seconds to several hours. Preferably, the lactam should be essentially anhydrous, as should the added base. The concentration of the base should be such as to provide a final concentration for the polymerization in the range of between 0.1 and about 10 mole percent based on the lactam polymerized. Proportions in the higher end of this range produce lower molecular weight polyamides, so optimum proportions for most purposes are from about 0.1 to 5 mole percent of the strong base.

Cocatalysts usable in the present invention are those which give a no flow time of about from 0.3 to 2.7 minutes determined as described hereinafter. Preferred cocatalysts are those having a no-flow time of less than about 2.5 minutes and selected from the group consisting of acyl lactams bearing at least two lactam rings, preferably acyl bislactams; compounds of the formula

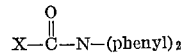

wherein X is a heterocyclic ring, and preferably a five-membered heterocyclic ring having two conjugated double bonds and at least two ring nitrogen atoms, one of which is bonded to the

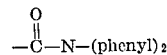

organic carbonates having at least one carbocyclic aromatic group bonded through aromatic carbon to an oxygen of a carbonate group, particularly those containing two carbocyclic aromatic groups each bonded through aromatic carbon to one oxygen of one oxygen of one carbonate group and those comprising polymers having the repeating structural unit

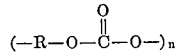

wherein n is from about 10 to 320 and R is a carbocyclic aromatic group bonded through an aromatic carbon to the indicated carbonate group; polymers having the repeating structural unit —(CF$_2$S)—, particularly those of the formula —(CF$_2$S)$_x$— wherein x is about from 3000 to 6000; 2,2,4-trimethyl-3-hydroxy-3-pentenoic acid β-lactone; and mixtures thereof. In addition, symmetrical triazine derivatives can be used having the structure

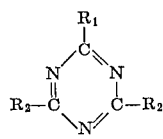

wherein R$_1$ is aryloxy, alkaryloxy, nitroaryloxy or halide and R$_2$ and R$_3$ may be the same as R$_1$ or may be dialkylamino, hydrogen, alkyl, alkenyl, aryl or alkaryl, and described more particularly in the copending application of Kohan and Munn, Ser. No. 135,791, filed Sept. 5, 1961.

The aforementioned acyl lactams include, for example, the addition products of lactams, preferably of 3 to 11 carbon atoms, with aliphatic, aromatic and cycloaliphatic isocyanates, particularly aliphatic and aromatic diisocyanates, as well as acyl lactams formed from corresponding acyl chlorides, acyl anhydrides or ketenes. The preparation and structure of the aforementioned acyl lactams is illustrated by the following equation for the addition of lactams and diisocyanates:

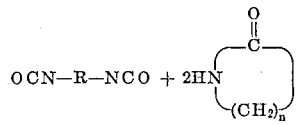

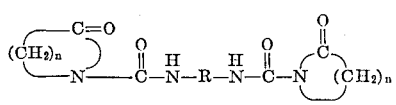

wherein n is 3 to 11 and preferably 5, and R is an aromatic, aliphatic or cycloaliphatic radical preferably up to 20 carbon atoms. If the isocyanate contains more than two —NCO groups, the number of moles of lactam employed for the adduct is equal to the number of isocyanate groups in the isocyanate. The reaction of acyl chlorides, acyl anhydrides and ketenes with lactams yields similar products, except that R is bonded directly to the carbonyl groups or; for example, where oxalyl chloride is employed the carbonyl groups are bonded directly to each other. More detailed descriptions of diphenylcarbamyl heterocyclic cocatalysts, aromatic carbonate cocatalysts and polymeric —$(CF_2S)$— cocatalysts useful in this invention and their method of preparation are given, respectively, in copending applications assigned to the assignor of the present application Ser. No. 274,803, filed Apr. 22, 1963, now Patent No. 3,274,132; Ser. No. 242,895, filed Dec. 7, 1962, now Patent No. 3,207,713 and Ser. No. 138,301, filed Sept. 15, 1961, now Patent No. 3,138,575. A representative list of examples of some cocatalysts that can be used in the process of this invention are:

2/1 adduct of $\epsilon$-caprolactam and 2,4-toluenediisocyanate
2/1 adduct of $\epsilon$-caprolactam and hexamethylenediisocyanate
2/1 adduct of $\epsilon$-caprolactam and 4,4'-methylenebis-(phenyl isocyanate)
3/1 adduct of $\epsilon$-caprolactam and 1,4-xylene-2,4,6-triisocyanate
N,N'-carbonyl-biscaprolactam
N,N'-oxalylbiscaprolactam
N,N'-sebacoylbiscaprolactam
N,N'-azeloylbiscaprolactam
1-diphenylcarbamylimidazole
1-diphenylcarbamylpyrazole
1-diphenylcarbamyl-1,2,4-triazole
1-diphenylcarbamylbenzimidazole
1-diphenylcarbamylbenzo-1,2,3-triazole
Diphenyl carbonate
Poly[2,2-propanebis(4-phenyl carbonate)]
Diethyleneglycolbis(phenyl carbonate)
1-chloro-sym-triazine
1,3-dichloro-sym-triazine
1,3-diphenoxy-5-dimethylamino-sym-triazine
1,3,5-triphenoxy-sym-triazine
Polymers of the formula —$(CH_2S)_x$— where $x$ is 3000 to 6000.

Mixtures of cocatalysts giving a no flow time as specified hereinbefore are also suitable.

The cocatalyst may be added to the lactam containing the anionic polymerization catalyst, or equally well, the cocatalyst may be dissolved in a separate portion of the lactam and that portion can be mixed at the time polymerization is desired with the other lactam containing portion.

For optimum operation of the process of this invention, an inert gas such as nitrogen is bubbled through the molten lactam during the initial reaction with the basic catalyst in order to remove any low molecular weight compound formed, such as water, and in order to prevent oxidation. Alternatively, the reaction of the lactam with the basic catalyst may be carried out under reduced pressure in which case the low molecular weight compound is distilled from the lactam.

The process of this invention is useful in rapidly preparing cast articles of any size and shape from lactams and it may be employed to obtain unusual shapes which would be difficult, if not impossible, to obtain by conventional molding of prepolymerized polyamides. The process has the advantage when used in this fashion that high temperatures and high pressures normally required in injection molding and similar processes are not necessary. Therefore, simpler lighter weight molds may be employed and faster cycles can often be obtained in the preparation of large shaped articles. The entire process can be carried out in the mold or, if desired, the lactam solution containing the anionic catalyst and a second portion of the lactam solution containing the cocatalyst can be mixed and then immediately cast into the mold by procedures similar to transfer molding to obtain the desired shaped article in any size at a very high rate. Similarly, it is possible to employ the process of this invention in many extrusion-type operations, in which the lactam containing the anionic catalyst and another portion of the lactam containing the cocatalyst are intimately mixed and then extruded under conditions which provide for obtaining and extrudate which is polymerized as it is formed.

The process of this invention is operable in the presence of various fillers and reinforcing agents. Thus, if desired, glass mats or mats of synthetic fibers can be impregnated with the solution and rapidly cured. Similarly, finely-divided fillers, for example, $CaCO_3$, bentonite, $TiO_2$, ground scrap polycaprolactam and others, can be suspended in the polymerizing mixture to obtain filled polyamides. Conventional antioxidants, for example, diphenylamine, hydroquinone, p-tert-butylphenol, plasticizers, for example, high molecular weight hydrocarbons, tetramethylene sulfone, diethylformamide, resins and other polymers, for example, 66 nylon and polystyrene, colorants, for example $TiO_2$ and carbon black, and the like may also be employed. A surfactant such as potassium stearate, siloxanes and the like may, if desired, be added to the caprolactam before polymerization. These agents have the beneficial effect of promoting foam formation and act as mold-release agents without interfering with the polymerization of the lactam. The process of this invention can be used under all of the above conditions and; furthermore, it can be carried out as a coating process in which the lactam solution containing an anionic catalyst, a cocatalyst and the blowing agent composition, is applied as a liquid to metal, plastic, wood or the surface of a web, such as paper or a textile and then permitted to polymerize to the polyamide and thus form a coating of polyamide film on a substrate.

The invention is more thoroughly illustrated with the aid of the following examples illustrating preferred methods for conducting the process. In the examples parts, where given, are by weight and physical properties are measured by ASTM Methods D638–52T and D256–54T.

EXAMPLES

The procedure for determining the speed of a cocatalyst is as follows: $\epsilon$-Caprolactam (40 g.) is heated in a tube to 80° C. and 0.255 g. of NaH/white mineral oil (50/50) by weight is added. The lactam is sparged with nitrogen at a flow rate of 750 ml./min. and heated to 150° C. The cocatalyst (0.3 mole percent based on lactam) is added and nitrogen sparging continued for 15 sec. and then is stopped. The time is measured from the addition of the cocatalyst until the viscosity of the mix increases to the point where it no longer flows when the tube is tilted at 45° to the horizontal. This time is called the "no-flow time." A cocatalyst having a "no-flow time" of less than about 1.5 minutes is defined as a fast cocatalyst. A suitable combination of a fast cocatalyst with a slower cocatalyst is frequently advantageous in the practice of this invention.

*Example 1*

Formulation: Parts
Dry caprolactam portion "A" _____ 70
Dry caprolactam portion "B" _____ 70
"Non-Fer-Al (precipitated calcium carbonate filler) _____ 70
Potassium stearate (KS) _____ 4.2
50/50 NaH/white mineral oil (1.5 mole percent) _____ 0.89
Diphenylcarbonate (0.1 mole percent) _____ 0.27
β-Lactone of 2,2,4-trimethyl-3-hydroxy-3-pentenoic acid (TMBL) (0.4 mole percent) ___ 0.69
$\alpha,\alpha_4$-Diazidohexamethylbenzene (DAD, diazidomethyldurene), (0.8 part/100 parts of lactam) _____ 1.12

Procedure.—This experiment is a control illustrating the results obtained when the polymerization reaction is carried out without a blowing agent comprising an allylic azide and an aliphatic hydrocarbon. Mix A is formed by adding NaH-oil to molten caprolactam portion "A" at 80–100° C. in a tube, the melt is heated in an oil bath to 150° C. while agitating with $N_2$ over a period of 5 minutes and potassium stearate is dissolved in the melt at 150° C. with further $N_2$ agitation. Mix "B" is formed by adding caprolactam portion "B," calcium carbonate filler, diazidomethyldurene, and diphenyl carbonate to a test tube, agitating the melt with $N_2$, adjusting the temperature to 150° C. and injecting the β-lactone of 2,2,4-trimethyl-3-hydroxy-3-pentanoic acid, hereinafter referred to as TMBL, into this "B" slurry portion and agitating for 5 sec. with $N_2$. The two mixes (A and B) are combined, vigorously agitated for 10 sec. with $N_2$, and poured into a sheet mold filled with $N_2$ and preheated to 150° C. in an oil bath. After 8 minutes in the oil bath the mold is opened and the foamed sheet produced has a smooth surface, a moderately uniform cell structure, and a density of 0.62 g./cc.

D. In contrast, repeating the above formulation and procedure with the exception that mix A and mix B are saturated with propane at 150° C. by sparging each melt with propane for 3 minutes at the rate of about 750 cc./min. before combination. After the mixes are combined, mixing for 10 sec. is carried out with propane instead of $N_2$. The foam sheet thus prepared has a density of 0.52 g./cc. and is generally similar otherwise to the product made above.

*Example 2*

C. The formulation and procedure are the same as that described in Example 1D with the exception that diazidomethyldurene is reduced to 0.84 gram, or 0.6 part per hundred parts of caprolactam. The very attractive foamed sheet that is formed has a density of 0.58 g./cc. and a very smooth, fine-textured skin.

D. The formulation and procedure are the same as above in 2C with the following variations:
 (1) Diazidomethyldurene is increased to 1.0 part per hundred parts of lactam, or 1.4 parts.
 (2) Nitrogen gas is used for stream saturation instead of propane.

The foamed sheet thus obtained has a density of 0.61 g./cc., and a smooth, fine-textured surface. The physical property comparison between the products made with propane and nitrogen saturation is given as follows:

| Gas Used | Tensile Strength, p.s.i. | Elong., percent | Unnotched Izod, ft. lb./in. | Secant Modulus ½% Strain, p.s.i. | Water Extractables, percent |
|---|---|---|---|---|---|
| Propane | 765 | 10.0 | 0.58 | 66,000 | 8.2 |
| Nitrogen | 665 | 11.1 | 0.61 | 55,000 | 13.9 |

This comparison illustrates the effect of increasing product stiffness, lowering water extractables, and lowering the amount of chemical blowing agent required when employing in the process propane and diazidomethyldurene.

*Example 3*

The formulation and procedure are the same as those described in Example 1D with the following exceptions:
 (1) The diphenyl carbonate is eliminated as part of the cocatalyst system; the TMBL cocatalyst is increased to 0.5 mole percent, or 0.87 part.
 (2) Diazidomethyldurene is eliminated; the chemical blowing agent component used is dodecenylazide, 1.15 parts per hundred parts of lactam, (1.61 parts) which is injected into mix B at 150° C., just before the addition of mix A.

The foamed sheet thus prepared has an "applesauce" texture, a uniform cell structure, and a density of 0.58 g./cc.

*Example 4*

The formulation and procedure are the same as those described in Example 3 with the following exceptions:
 (1) The dodecenyl azide blowing agent component is reduced to 0.6 part per hundred parts of lactam.
 (2) Mix A and mix B are saturated with butane gas at 150° C. before the blowing agent component dodecenyl azide is added and the mixes combined for polymerization and foaming.

The resulting foamed sheet has a density of 0.58 g./cc. and is otherwise similar to the foam of Example 3. The water extractable content of this foam is 5.4% as compared with 10.0% for the foam of Example 3.

*Example 5*

C. Formulation: Parts
 Dry caprolactam portion "A" _____ 80
 Dry caprolactam portion "B" _____ 80
 "Non-Fer-Al" ($CaCO_3$) _____ 80
 Potassium stearate (KS) _____ 4.8
 50/50 NaH/white mineral oil (1.5 mole percent) _____ 1.02
 Diphenylcarbamylimidazole (DPCI) (0.4 mole percent) _____ 1.5
 Dodecenyl azide (DDA) _____ 1.44

Procedure.—This experiment is a control illustrating for purposes of comparison the process conducted without the blowing agent comprising an allylic azide and an aliphatic hydrocarbon.

The hydride-oil is added to caprolactam portion "A" at 80–100° C., the melt is agitated with $N_2$ and heated further to 150° C. and potassium stearate is dissolved with $N_2$ agitation in this 150° C. melt that constitutes mix A.

Mix B is prepared by adding together caprolactam portion "B," $CaCO_3$ and diphenylcarbamylimidazole, agitating with $N_2$ and adjusting the temperature to 150° C. Dodecenyl azide is injected into mix B. Mix A is added to mix B and the combined mixture is agitated at 150° C. for 10 sec. with $N_2$. This mixture is then poured into the ¼″ sheet mold preheated to 150° C. After 8 min. in a 150° C. oil bath, the mold is removed, cooled, and opened. The foamed sheet thus formed has a density of 0.72 g./cc. and a water extractable content of 10.5% (100% polyamide basis).

D. The formulation and procedure are the same as that described in Example 5C with the following exceptions:

(1) The amount of dodecenyl azide is reduced to 0.5 part per hundred parts of lactam (0.80 part DDA).
 (2) Propane is used in place of nitrogen for mixing and lactam saturation.

The foamed sheet that is formed has a finer texture than the foam of 5C, a density of 0.71 g./cc., and a water extractable content of 7.5% (100% polyamide basis).

*Example 6*

C. Formulation: Parts
 Dry caprolactam portion "A" _____ 120
 Dry caprolactam portion "B" _____ 120
 Potassium stearate (KS) _____ 7.2
 "Lexan" 105 [poly(diphenylolpropane carbonate)] _____ 1.08
 50/50 NaH/oil (1.5 mole percent) _____ 1.53
 Diazidomethyldurene (DAD) (0.2 part per 100 parts lactam _____ 0.48

Procedure.—Mix A is prepared by adding the hydride-oil to lactam portion "A" at 80–100° C., the melt is sparged with propane to 150° C. and potassium stearate is added and dissolved with propane agitation.

Lactam portion "B" poly(diphenylpropane carbonate) hereinafter referred to as "Lexan" and diazidomethyldurene are mixed and heated to 150° C. with $N_2$ agitation. This constitutes mix B. Mix A and B were combined, agitated for 10 sec. with propane, and poured into the ¼″ sheet mold pre-heated to 150° C. After 8 min. the foamed sheet that is formed is removed from the mold. The smooth foamed sheet has a density of 0.64 g./cc. and a water extractable content of 10.2%.

D. The formulation and procedure are the same as in Example 6C with the following exceptions: This example is a control to show the higher water extractable content and decreased stiffness obtained when nitrogen is substituted for the hydrocarbon component of the blowing agent composition.

(1) The diazidomethyldurene is increased to 0.45 part per 100 parts lactam or 1.08 parts.

(2) Nitrogen gas is used, instead of propane, for mixing and saturation. The foamed, ¼″ thick sheet that is formed has a density of 0.67 g./cc. and a water-extractable content of 15.4%. The foam of Example 6C is appreciably stiffer (secant modulus, 2% strain, 119,000 p.s.i.) than the foam of Example 6D (sec. mod. 79,000 p.s.i.).

Example 7

Formulation:

| | Parts |
|---|---|
| Dry caprolactam portion "A" | 70 |
| Dry caprolactam portion "B" | 70 |
| "Non-Fer-Al" (CaCO$_3$) | 70 |
| "Lexan" 105 poly(diphenylolpropane carbonate) | 0.32 |
| TMBL (0.4 mole percent) | 0.74 |
| Potassium stearate (KS) | 4.2 |
| 50/50 NaH/oil (1.5 mole percent) | 0.89 |
| Dodecenyl azide (DDA) | 1.12 |

Procedure.—Mix A is prepared by adding the hydride-oil to lactam portion "A" at 80–100° C., the melt is sparged with N$_2$ to 150° C. and potassium stearate is dissolved therein with N$_2$ agitation. Mix A is then saturated with propylene at 150° C.

Mix B is formed by adding together lactam portion "B," CaCO$_3$, and "Lexan," agitating with N$_2$ and adjusting the temperature to 150° C. and adding TMBL. This mix is saturated with propylene and the dodecenyl azide added. Mix A and B are combined and mixed for 10 sec. with propylene and then is poured into the ¼″ sheet mold preheated in an oil bath to 150° C. The foamed sheet thus formed is removed after 8 min., it has a fine-textured surface, a uniform cell structure, and a density of 0.56 g./cc.

Example 8

The formulation and procedure are the same as in Example 7 with the substitution of ethylene for propylene. The foamed sheet had a density of 0.66 g./cc.

Example 9

Formulation:

| | Parts |
|---|---|
| Dry caprolactam portion "A" | 70 |
| Dry caprolactam portion "B" | 70 |
| "Non-Fer-Al" (CaCO$_3$) | 70 |
| Potassium stearate (KS) | 4.2 |
| 50/50 NaH/oil (1.8 mole percent) | 1.08 |
| "Lexan" 105 [poly(diphenylolpropane carbonate)] | 1.27 |
| Mixed dimethylbenzylazides (DMBA) (principally 3,4 and 2,3 isomers) | 0.56 |

Procedure.—Mix A is prepared by adding the NaH-oil to Lactam portion "A" at 80–100° C., the melt is sparged to 150° C. with N$_2$, potassium stearate is added, and the melt is saturated at 150° C. with propane.

Mix B is prepared by adding together Lactam portion "B," "Lexan," and CaCO$_3$, agitating with N$_2$, and heating to 150° C. This slurry is saturated with propane. Mix A and B are combined, agitated for 5 sec. with propane, and this mixture is poured into a ¼″ sheet mold in an oil bath maintained at 150° C. After 5 minutes, the mold is removed from the oil bath and quenched with water. The foamed sheet that forms has a density of 0.58 g./cc. and an unusual satin-like skin texture.

Example 10

Formulation:

| | Parts |
|---|---|
| Dry caprolactam portion "A" | 70 |
| Dry caprolactam portion "B" | 70 |
| "Non-Fer-Al (CaCO$_3$) | 70 |
| Potassium stearate (KS) | 4.2 |
| 50/50 NaH mineral oil (1.5 mol percent) | 0.89 |
| "Lexan" 105 | 0.32 |
| TMBL (0.4 mole percent) | 0.69 |
| 60/40 dodecenylazide/n-pentane | 1.87 |

Procedure.—Mix A is formed by mixing lactam portion "A," CaCO$_3$ and "Lexan," sparging with nitrogen, heating to 150° C. and injecting TMBL into this mix.

Mix B is prepared by adding the NaH-oil to lactam portion "B" melt at 100° C., and the melt is sparged with N$_2$ and adjusted to 150° C. Potassium stearate is dissolved therein with further nitrogen sparging.

Mix A and mix B are combined and dodecenyl azide/n-pentane solution is injected into the bottom of the mixture. This mixture is stirred for 10 sec. and then poured into a ¼″ sheet mold. After 10 min. in the 150° C. oil bath, the foamed plastic sheet that is formed has a density of 0.62 g./cc., a finely textured skin, and a moderately uniform cell structure.

Example 11

The ingredients and procedure are the same as described in Example 10 with the following exceptions: (1) the sole cocatalyst employed is 0.87 part TMBL, or 0.5 mole percent. (2) Instead of 60/40 (by wt.) dodecenyl azide/n-pentane the blowing agent is 60/40 dodecenyl azide/n-hexane (1.87 parts).

The product thus obtained has a density of 0.62 g./cc., a somewhat "applesauce-like" skin texture, and a uniform cell structure. The boiling water extractable content of the foam is 4.8 wt. percent in comparison with 6.7 wt. percent for foam of the same density blown with dodecenyl azide as the sole blowing agent.

Example 12

The formulation and procedure are the same as described in Example 10 with the following exceptions: (1) For the "B" portion of lactam, seven parts of caprolactam is replaced by seven parts of laurolactam. (2) As the blowing agent 1.61 parts of 60/40 dodecenyl azide/n-heptane is employed.

The foamed sheet thus obtained has a density of 0.62 g./cc., a finely-textured skin, and a fine, uniform cell structure. The physical properties of the foamed sheet adjusted to a water content associated with 50% relative humidity and 73° F. are given as follows:

| | |
|---|---|
| Tensile Strength, p.s.i. | 945 |
| Elongation, percent | 12.7 |
| Secant Modulus ½ percent Strain, p.s.i. | 104,000 |
| Unnotched Izod Impact, ft. lb./in. | 1.04 |

Example 13

Formulation:

| | Parts |
|---|---|
| Dry caprolactam portion "A" | 115 |
| Dry caprolactam portion "B" | 115 |
| Potassium stearate (KS) | 6.9 |
| "Non-Fer-Al" (CaCO$_3$) | 115 |
| 50/50 NaH-mineral oil (1.5 mole percent) | 1.46 |
| TMBL (0.5 mole percent) | 1.43 |
| 60/40 dodecenyl azide/n-hexane | 2.65 |

Mix A is prepared by mixing Lactam portion "A" and CaCO$_3$, sparging the mix with nitrogen, adjusting the temperature to 150° C. and injecting TMBL into the mixture.

Mix B is prepared by adding the NaH-oil to lactam portion "B" melt at 100° C., the melt is sparged with N$_2$, adjusted to 150° C. and potassium stearate is added and dissolved therein.

Mixes A and B are combined, a solution of dodecenyl azide/n-hexane is injected into the bottom of the mix, the mix is agitated with $N_2$ for 10 sec. and is poured into a sheet mold 0.65 cm. x 27.85 cm. x 30.5 cm., clamped in a press and heated by 63 p.s.i.g. steam. After 8 min. the mold is opened to remove the resulting foamed sheet. The sheet thus obtained has a density of 0.61 g./cc., a skin of fine texture, and a fine, uniform cell structure. The physical properties of the foam equilibrated at 50% relative humidity and 73° F. are given as follows:

| | |
|---|---:|
| Tensile Strength, p.s.i. | 700 |
| Elongation, percent | 8.0 |
| Secant modulus ½% strain, p.s.i. | 74,000 |
| Unnotched Izod Impact, ft. lb./in. | 0.54 |

Example 14

Formulation:

| | Parts |
|---|---:|
| Dry caprolactam portion "A" | 150 |
| Dry caprolactam portion "B" | 300 |
| "Non-Fer-Al" ($CaCO_3$) | 300 |
| Potassium stearate (KS) | 9.0 |
| 53% NaH-mineral oil | 3.0 |
| $TiO_2$ ("Ti pure" FF grade) | 3.0 |
| "Vulcan" VR-72-C (Cabot carbon black) | 0.0036 |
| Polyamide resin (M.P. 148-160° C.) | 24.0 |
| ACT (2 - dimethylamino - 4,6-dichloro-s-triazine) | 2.56 |
| 60/40 dodecenyl azide/n-hexane | 3.0 |

Procedure.—Polyamide is dissolved in lactam portion "B" at 150° C. $CaCO_3$, carbon black, and $TiO_2$ are blended in the mix at 150° C., under nitrogen blanketing, by means of a premier dispersator. 2-dimethylamino-4,6-dichloro-s-triazine is dissolved in this mixture, constituting mix B.

Mix A is prepared by adding the NaH-oil to lactam portion "A" at 100° C., the melt is sparged with $N_2$ to 150° C., and potassium stearate is dissolved in the solution.

Mix A and mix B are combined, a solution of dodecenyl azide/hexane is injected into this mixture and it is sparged for 10 sec. with $N_2$, and then poured into a mold. After 10 min. in the mold heated by 63 p.s.i.g. steam the mold is opened and the foamed sheet that is formed is removed. The attractive grey foamed sheet has a density of 0.71 g./cc. and a moderately uniform, moderately fine cell structure.

Example 15

Formulation:

| | Parts |
|---|---:|
| Dry caprolactam portion "A" | 135 |
| Dry caprolactam portion "B" | 135 |
| "Non-Fer-Al" ($CaCO_3$) | 135 |
| Potassium stearate (KS) | 8.1 |
| 53% NaH-mineral oil | 1.95 |
| N,N'-sebacoylbispyrazole (SBP) | 2.88 |
| 50/50 dimethylbenzylazide (mixed isomers)/n-hexane | 1.62 |

Procedure.—Mix A is prepared by adding the NaH-oil to lactam portion "A" at 100° C., the mix is sparged to 150° C., and potassium stearate is dissolved in the solution.

Mix B is prepared by adding and mixing lactam portion "B," $CaCO_3$ and N,N'-sebacoylbispyrazole, sparging with $N_2$, adjusting the temperature to 150° C.

Mix A and mix B are combined and a solution of hexane in dimethylbenzylazide is injected into the combined mix. Then the mixture is agitated for 10 sec. with $N_2$ and poured into a mold. After 10 min. the mold is opened to remove the resulting foamed sheet. The sheet has a density of 0.73 g./cc. and moderately fine uniform cell structure.

Example 16

The formulation and procedure are the same as described in Example 15 with the following exceptions: (1) The NaH-oil (53% NaH) is 1.63 parts. (2) Fourteen parts of caprolactam "B" is replaced by an equal weight of caprylolactam. (3) N,N'-sebacoylbispyrazole is omitted; the sole cocatalyst is 1.67 parts of TMBL injected into mix B at 150° C. (4) The blowing agent is 2.7 parts of 60/40 dodecenyl azide/n-hexane.

The foamed sheet thus prepared has a density of 0.65 g./cc. and a moderately fine uniform cell structure. By vacuum extraction, the foam has a residual monomer content of 3.5%. The physical properties of the dry foam are given as follows:

| | |
|---|---:|
| Tensile strength, p.s.i. | 1170 |
| Elongation, percent | 12.5 |
| Secant modulus, ½ percent strain, p.s.i. | 144,000 |
| Unnotched Izod impact, ft. lb./in. | 0.70 |

Example 17

The formulation and procedure are the same as described in Example 15 with the following exceptions: (1) The 53% NaH in mineral oil is increased to 2.5 mole percent, or 2.71 parts. (2) The cocatalyst is changed to 0.3 mole percent of triphenoxy-s-triazine, or 2.56 parts. (3) The blowing agent is changed to 2.69 parts of 60/40 dodecenylazide/n-hexane.

The foam thus prepared has a density of 0.70 g./cc., a moderately uniform cell structure, and a skin of apple-sauce-like texture.

We claim:

1. In a process for the production of polyamide foams by the anionic cocatalyzed polymerization of lactam having 3 to 12 carbon atoms in the lactam ring, the improvement comprising conducting the polymerization reaction in the presence of a blowing agent which comprises at least one aliphatic hydrocarbon having from 2 to 7 carbon atoms and an allylic azide having the structure

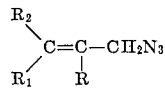

in which at least one azidomethyl group is directly attached to a carbon atom which in turn is attached to another carbon atom by a double bond and wherein R, $R_1$ and $R_2$ are selected from the group consisting of hydrogen, alkyl and aryl, and R and $R_1$ when taken together represent the carbon atoms of a benzenoid ring.

2. In a process for the production of polycaprolactam foams by the anionic cocatalyzed polymerization of caprolactam, the improvement comprising conducting the polymerization reaction in the presence of a blowing agent which comprises at least one aliphatic hydrocarbon having from 2 to 7 carbon atoms and an allylic azide having the structure

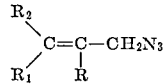

in which at least one azidomethyl group is directly attached to a carbon atom which in turn is attached to another carbon atom by a double bond and wherein R, $R_1$ and $R_2$ are selected from the group consisting of hydrogen, alkyl and aryl, and R and $R_1$ when taken together represent the carbon atoms of a benzenoid ring.

3. In a process for the production of polycaprolactam foams by the anionic cocatalyzed polymerization of caprolactam, the improvement comprising conducting the polymerization process in the presence of a blowing agent which comprises at least one aliphatic hydrocarbon having from 2 to 7 carbon atoms and an allylic azide selected from the group consisting of aliphatic azides having 8 to 24 carbon atoms and benzyl azides.

4. The process of claim 3 wherein the hydrocarbon is hexane and the allylic azide is dodecenyl azide.

5. The process of claim 3 wherein the hydrocarbon is propane and the allylic azide is diazidomethyldurene.

6. The process of claim 3 wherein the hydrocarbon is propane and the allylic azide is dimethylbenzyl azide.

7. The process of claim 3 wherein the hydrocarbon is pentane and the allylic azide is dodecenyl azide.

8. The process according to claim 3 wherein the hydrocarbon is butane and the allylic azide is phenoxybenzyl azide.

9. In a process for the production of polyamide foams by the anionic cocatalyzed polymerization of lactam having 3 to 12 carbon atoms in the lactam ring the improvement comprising conducting the polymerization reaction in the presence of a blowing agent which comprises at least one hydrocarbon having from 2 to 7 carbon atoms at a concentration of from about 0.1 to 0.6 part hydrocarbon per 100 parts of lactam and at least one allylic azide having the structure

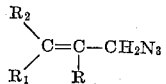

in which at least one azidomethyl group is directly attached to a carbon atom which in turn is attached to another carbon atom by a double bond and wherein R, $R_1$ and $R_2$ are selected from the group consisting of hydrogen, alkyl and aryl, and R and $R_1$ when taken together represent the carbon atoms of a benzenoid ring at a concentration of from about 0.1 to 0.8 part azide per 100 parts of lactam.

10. The process according to claim 9 wherein the polyamide is polycaprolactam.

References Cited
UNITED STATES PATENTS

| | | | |
|---|---|---|---|
| 2,268,160 | 12/1941 | Miles | 260—2.5 |
| 3,232,892 | 2/1966 | Fisher | 260—2.5 |
| 3,236,789 | 2/1966 | Fuller | 260—2.5 |

MURRAY TILLMAN, *Primary Examiner.*

M. FOELAK, *Assistant Examiner.*